July 21, 1970 F. E. BOERGER ET AL 3,521,018

TEMPERATURE SENSOR

Filed Sept. 26, 1968

INVENTORS
FRANK E. BOERGER
WILLIAM H. WHITE, JR.

BY Frank C. Leach Jr.
ATTORNEY

United States Patent Office 3,521,018

Patented July 21, 1970

3,521,018

TEMPERATURE SENSOR

Frank E. Boerger and William H. White, Jr., Poughkeepsie, N.Y., assignors to International Business Machines Corporation, Armonk, N.Y., a corporation of New York Filed Sept. 26, 1968, Ser. No. 762,756

Int. Cl. H05b 5/00, 5/04

U.S. Cl. 219—10.49 7 Claims

ABSTRACT OF THE DISCLOSURE

The temperature of a susceptor within a chamber, which is heated by an RF heating coil, is determined through disposing a secondary susceptor exterior of the chamber and within the field of the RF heating coil.

In epitaxially growing a film on a semiconductor substrate, for example, the substrate is disposed within an enclosed reaction chamber in which the film may be deposited by the epitaxial technique. This requires a relatively high temperature to exist within the chamber to produce the desired reaction.

The use of an RF heating coil has been found to satisfactorily produce the relatively high temperatures required within a reaction chamber. However, in order to have satisfactory and uniform epitaxial growth, the temperature must be maintained substantially constant during the reaction. Accordingly, it is necessary to be able to sense the temperature within the reaction chamber so that it may be maintained substantially constant on the substrates.

Furthermore, it is necessary to maintain the temperature substantially constant during the deposition of the film on each batch of the substrates disposed within the chamber. This is necessary to have a substantially uniform film deposited on all of the substrates so that a uniform product is obtained even though the substrates have the film formed thereon in two different batches, for example.

Since the properties of each carrier, which is the susceptor and supports a plurality of semiconductor substrates thereon, will not be the same, the use of a thermocouple with a susceptor within the reaction chamber will not produce uniformity of the temperature within the chamber having a plurality of different susceptors disposed therein, especially at different times. A uniform temperature is necessary to obtain consistency in the epitaxial film produced by the reaction within the chamber.

Furthermore, deterioration of the properties of each of the carriers, which function as susceptors, occurs throughout the reaction because of the exposure of the carrier to gases within the reaction chamber during the reaction. The properties of the carrier may change sufficiently to prevent the obtaining of a consistent temperature by the use of a thermocouple, for example, attached to the carrier. That is, as the properties of the carrier change due to the gases, for example, the thermocouple would indicate a different temperature existing even though the temperature of the carrier has not actually changed. This would result in the output of the RF heating coil being changed to attempt to produce the desired temperature within the reaction chamber. Accordingly, this false signal would result in the RF coil producing heat of a different amount than that required.

Since the thermocouple has to be extended exterior of the reaction chamber, this requires another seal to be provided in the chamber at the point at which the thermocouple exits therefrom. Thus, the possibility exists of undesired leakage of gas from the reaction chamber to again prevent the desired uniformity of the epitaxial film on each of a plurality of semiconductors disposed in the chamber at different times.

The present invention satisfactorily solves the foregoing problem by providing a temperature sensor that retains the same properties irrespective of the carrier disposed within the reaction chamber. This is accomplished by mounting a secondary susceptor, which is preferably the same material as the carriers forming the primary susceptors within the reaction chamber, exterior of the reactor. Thus, the secondary susceptor is not subjected to the environment within the reaction chamber so that its properties do not vary. Furthermore, since only the single secondary susceptor is utilized, its properties remain constant and proper calibration of the thermocouple, which is associated with the secondary susceptor, will produce uniform temperature readings correlated to the temperature of the susceptors within the reaction chamber to indicate the true temperature therein. Thus, proper control of the RF heating coil to obtain uniform temperature within the reaction chamber is obtained when using the temperature sensor of the present invention.

Since the secondary susceptor is formed of a material that tends to deteriorate, even in the atmosphere, it is preferable to encapsulate the secondary susceptor to extend its life. Otherwise, the secondary susceptor will have a shorter life span.

Since the secondary susceptor need only be disposed within the field of the RF heating coil, which is heating the reaction chamber, or the field of a secondary RF heating coil having proportional characteristics to the RF heating coil heating the reaction chamber, it is not necessary for the secondary susceptor to necessarily be disposed adjacent the reaction chamber. Accordingly, this flexibility of mounting the temperature sensor of the present invention in remote areas permits the temperature sensor of the present invention to be utilized for determining the temperature of relatively inaccessible reaction chambers.

An object of this invention is to provide a sensor for sensing the temperature, produced by an RF coil, within a chamber.

Another object of this invention is to provide a temperature sensor for use with an RF heated chamber in which the temperature sensor is not subjected to the environment of the chamber.

The foregoing and other objects, features, and advantages of the invention will be more apparent from the following more particular description of the preferred embodiment of the invention as illustrated in the accompanying drawing.

Figure 1:
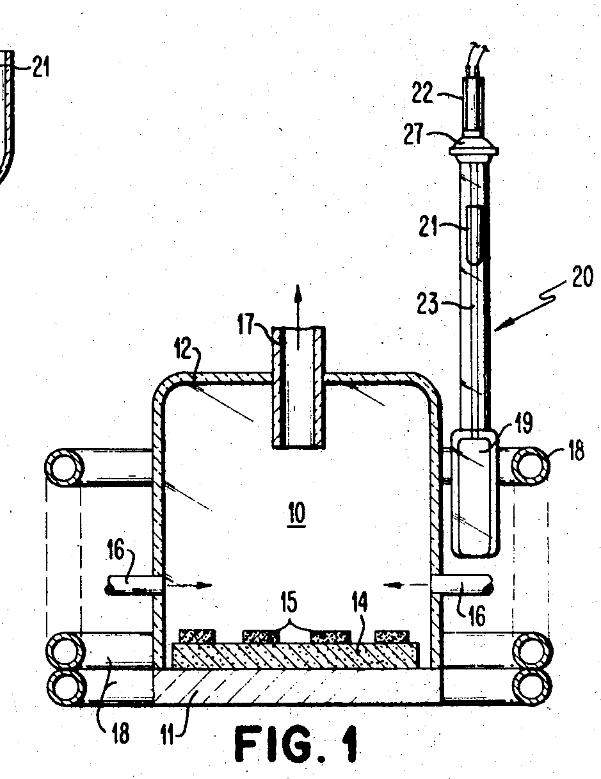
FIG. 1 is a sectional view of a reactor in which the reaction chamber is heated by an RF heating coil and the temperature sensor of the present invention is utilized to determine the temperature within the chamber.

Referring to the drawing and particularly FIG. 1, there is shown a reaction chamber 10 formed by a base plate 11 and a bell jar 12. The base plate 11 and the bell jar 12 are formed of a suitable material such as quartz, for example.

A carrier 14, which has a plurality of semiconductor substrates 15 supported on its top surface, is mounted within the chamber 10 on the upper surface of the base plate 11. The semiconductor substrates 15 are adapted to have a film deposited thereon by an epitaxial reaction through supplying a suitable gas to the interior of the chamber 10 by means of inlet ducts 16. The reaction exhaust gases escape from the chamber 10 through an outlet duct 17.

An RF heating coil 18 surrounds the reactor, which is formed by the base plate 11 and the bell jar 12, to provide heat to the semiconductor substrates 15. The RF heating coil 18 directs its heat to the carrier 14, which is formed of a suitable material such as carbon or graphite, for example, so as to be susceptible to the electromagnetic energy from the RF coil 18. Thus, by heating the carrier 14, the substrates 15 are heated by heat transfer from the carrier 14 to a desired temperature at which a film may be epitaxially deposited on each of the substrates 15 from the gas entering the chamber 10 through the inlet ducts 16.

The temperature sensor of the present invention includes a secondary susceptor 19, which is preferably formed of the same material as the carrier 14. The secondary susceptor 19 is shown disposed in the space between the exterior of the reaction chamber 10 and the RF heating coil 18. However, it should be understood that it is only necessary that the secondary susceptor 19 be disposed within the field of the RF heating coil 18 or a secondary RF heating coil having proportional characteristics to the coil 18 since the secondary susceptor 19 is utilized to sense the power level of the field of the coil 18. This permits the secondary susceptor 19 to be disposed at a remote location from the reaction chamber 10 if desired.

Figure 2:
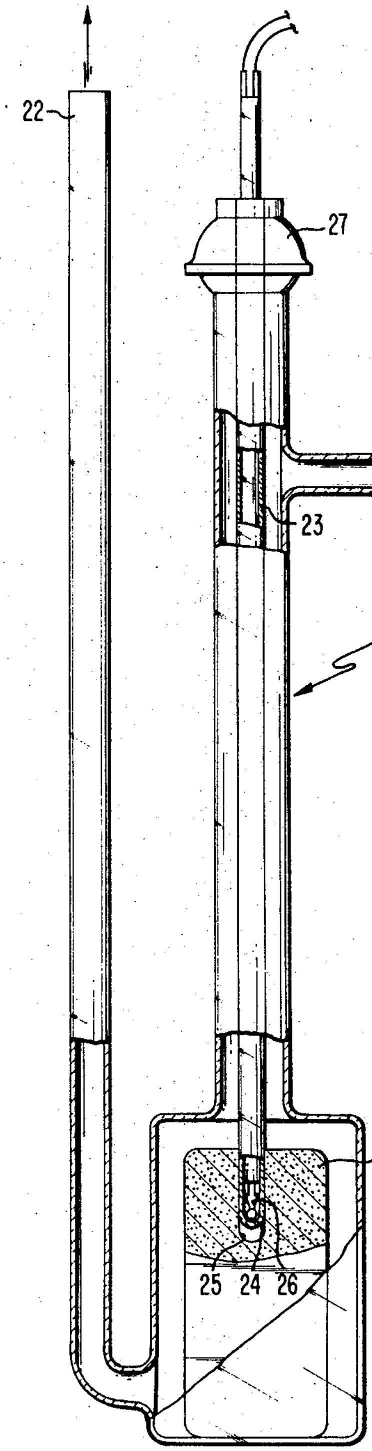
FIG. 2 is an enlarged elevational view, partly in section, showing the temperature sensor of the present invention.

As shown in FIG. 2, the secondary susceptor 19 is disposed within a member 20, which is preferably formed of quartz. While the member 20 is preferably formed of quartz, it should be understood that it could be formed of any other suitable material that is not susceptible to an RF field and is not damaged when subjected to a relatively large temperature range.

The member 20 encapsulates the secondary susceptor 19 and has a non-reactive gas passed therethrough to flow over the secondary susceptor 19 by being introduced through an inlet duct 21 and exiting through an outlet duct 22. Any suitable non-reactive gas such as nitrogen, for example, may be supplied to the interior of the member 20.

By encapsulating the secondary susceptor 19, the life span of the secondary susceptor 19 is appreciably lengthened since it is not exposed to the atmosphere. Oxygen from the atmosphere rapidly deteriorates the secondary susceptor 19. Accordingly, the properties of the secondary susceptor 19 will remain substantially uniform for a relatively long period of time when the secondary susceptor 19 is encapsulated and the non-reactive environment is maintained.

Instead of passing a non-reactive gas through the member 20, the member 20 could merely be sealed with a vacuum. This also would serve to maintain the properties of the secondary susceptor 19 substantially uniform for a relatively long period of time.

The interior of the member 20 supports a hollow tube 23, which has its lower end 24 closed as shown in FIG. 2, within a recess 25 in the secondary susceptor 19. The tube 23 is open at its upper end to receive a thermocouple 26, which is inserted into the tube 23 to measure the temperature of the secondary susceptor 19. The tube 23, which is preferably formed of quartz, is formed integral with a cap 27, which seals the open upper end of the member 20 into which the tube 23 extends.

The member 20 is preferably mounted on the bell jar 12 by suitable means. Thus, the susceptor 19 is supported by the bell jar 12 within the field of the RF heating coil 18.

Accordingly, when the temperature of the secondary susceptor 19 is sensed by the thermocouple 26, the sensed temperature is proportional to the temperature of the carriers 14 and the substrates 15. Thus, if the temperature of the secondary susceptor 19 rises, the current supplied to the coil 18 must be reduced to reduce the heat supplied to the carriers 14 within the chamber 10. Likewise, if the temperature of the secondary susceptor 19 decreases, the thermocouple 26 indicates this so as to require an increase in the current flow through the heating coil 18. Proper calibrations must be made to obtain the correct ratio of the temperature of the secondary susceptor 19 in comparison with the temperature of the carriers 14. Once this is done, the secondary susceptor 19 will give uniform readings even if the properties of the carriers 14 should deteriorate or change.

While the secondary susceptor 19 of the present invention has been shown as surrounded by the heating coil 18, it should be understood that the secondary susceptor 19 may be mounted exterior of the coil 18 as long as it is disposed within the field of the RF coil 18. Since the strength of the field of the coil 18 on the exterior thereof is weaker, it would be necessary to appropriately calibrate the readings of the thermocouple 26 from the secondary susceptor 19 when it is disposed exterior of the coil 18 to relate the temperature of the secondary susceptor 19 to the temperature of the carriers 14 within the chamber 10.

The secondary susceptor 19 may be disposed remote from the reaction chamber 10 and the heating coil 18. It is only necessary that the secondary susceptor 19 be disposed within the field of an RF coil having proportional characteristics to the RF heating coil 18 so as to obtain a measurement indicative of the power level of the field of the coil 18. In this arrangement, calibration of the temperature of the secondary susceptor 19 sensed by the thermocouple 26 would have to be made so that the temperature corresponds to the temperature of the carriers 14 within the chamber 10.

While the secondary susceptor 19 has been shown as being encapsulated within the member 20, it should be understood that the secondary susceptor 19 does not have to be encapsulated. However, the life of the secondary susceptor 19 could be substantially reduced due to the oxygen in the atmosphere.

While the present invention has been described with respect to the substrates 15 being disposed within the reaction chamber 10 and subjected to the gases flowing through the inlet duct 16 for formation of an epitaxial film on the substrates 15, it should be understood that the substrates 15 could be continuously moved through the reaction chamber 10. When used in this arrangement, the secondary susceptor 19 of the present invention eliminates any influence due to the moving carriers and substrates. Thus, when the moving carrier and the substrates would initially enter the reaction chamber 10, they would be relatively cold so as to give a misleading temperature to a control system for controlling the heating coil 18. Through utilization of the secondary susceptor 19 of the present invention, this problem does not exist.

Figure 3:
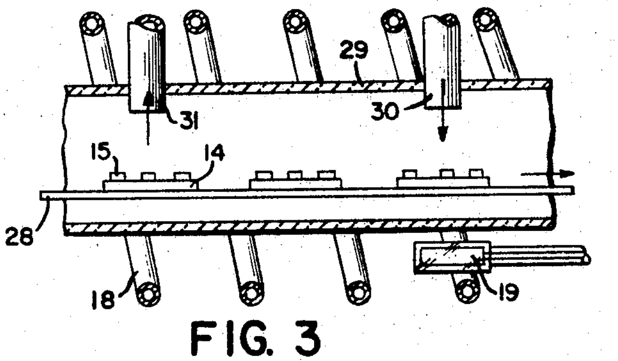
FIG. 3 is a longitudinal sectional view, partly in elevation, of a reactor in which the reaction chamber is heated by an RF heating coil, the reaction chamber has carriers movable therethrough with substrates thereon for heating, and the temperature sensor of the present invention is utilized to determine the temperature within the chamber.

As shown in FIG. 3, a plurality of the carriers 14 is mounted on a conveyor 28 to continuously move the carriers 14 through a reaction chamber 29, which is similar to the reaction chamber 10. Each of the carriers 14 has one or more of the substrates 15 mounted thereon.

The reaction chamber 29 has an inlet duct 30 for gas to enter the reaction chamber 29 in the manner as described for the inlet duct 16 of FIG. 1 and an outlet duct 31 for the reaction exhaust gases to escape from the chamber 29 in the manner described for the outlet duct 17 of FIG. 1.

The secondary susceptor 19 is disposed within the RF heating coil 18 to determine the temperature of each of the carriers 14 within the reaction chamber 29 without any effect due to the continuous movement of the carriers 14 and the substrates 15 through the reaction chamber 29. Thus, an accurate determination of each of the carriers 14 is obtained.

While the secondary susceptor 19 has been described as preferably being of the same material as the carriers 14, it should be understood that such is not a requisite of the present invention. If the secondary susceptor 19 is formed of a different material than the carriers 14, the output of the thermaocouple 26 must be appropriately calibrated. It is only necessary that the secondary susceptor 19 be of a material that receives the electromagnetic energy of the heating coil 18 or another coil having proportional characteristics to the coil 18.

An advantage of this invention is that control of the temperature within an epitaxial reactor is not affected by changes in properties of the susceptors within the reaction chamber. Another advantage of this invention is that it is not necessary for temperature sensors to be disposed within a chamber, which is heated by an RF heating coil, in order to determine the temperature within the chamber.

While the invention has been particularly shown and described with reference to a preferred embodiment thereof, it will be understood by those skilled in the art that various changes in form and details may be made therein without departing from the spirit and scope of the invention.

What is claimed is:

1. A device for determining the temperature of at least one susceptor within a processing chamber using an RF heating coil including:
- a susceptor disposed exterior of the chamber and within the RF heating coil so as to be surrounded thereby to receive electromagnetic energy indicative of the power level of the field of the RF heating coil;
- means to encapsulate said exterior susceptor;
- means to supply a non-reactive gas to said exterior susceptor within said encapsulating means;
- and means disposed within said encapsulating means to sense the temperature of said exterior susceptor.

2. The device according to claim 1 in which the susceptor continuously moves through the processing chamber.

3. In combination:
- a processing chamber;
- means to continuously move a plurality of susceptors through said processing chamber;
- an RF heating coil surrounding said processing chamber to heat each of the susceptors during its movement through said processing chamber;
- means to determine the temperature of each of the susceptors within said processing chamber;

- and said determining means including:
  - a secondary susceptor mounted exterior of said processing chamber in spaced relation to said processing chamber and within said RF heating coil so as to be surrounded thereby to receive electromagnetic energy indicative of the power level of the field of said RF heating coil to indicate the temperature of each of the susceptors within said processing chamber;
  - and means to measure the temperature of said secondary susceptor.

4. The combination according to claim 3 including:
- means to encapsulate said secondary susceptor;
- and means to supply a non-reactive gas to said secondary susceptor within said encapsulating means.

5. The combination according to claim 4 in which said measuring means includes means disposed within said encapsulating means.

6. A method of determining the temperature of each of a plurality of different susceptors continuously moving through a processing chamber surrounded by an RF heating coil that heats each of the susceptors in the processing chamber including:
- placing a secondary susceptor exterior of the processing chamber but within the RF heating coil so as to be surrounded thereby to be receptive to electromagnetic energy indicative of the power level of the field of the RF heating coil;
- and measuring the temperature of the secondary susceptor to determine the temperature of each of the different susceptors continuously moving through the processing chamber.

7. The method according to claim 6 including encapsulating the secondary susceptor and directing a non-reactive gas within the encapsulating means to the secondary susceptor.

References Cited

UNITED STATES PATENTS

| | | | |
|---|---|---|---|
| 2,841,679 | 7/1958 | Yamazaki | 219—10.51 |
| 2,906,844 | 9/1959 | Hammond | 219—10.49 |
| 3,036,888 | 5/1962 | Lowe | 219—10.49 X |
| 3,097,283 | 7/1963 | Giacchetti | 219—10.77 |

JOSEPH V. TRUNE, Primary Examiner

L. H. BENDER, Assistant Examiner

U.S. Cl. X.R.

219—10.51, 10.77